(12) United States Patent
Gowda et al.

(10) Patent No.: US 7,093,423 B2
(45) Date of Patent: Aug. 22, 2006

(54) METHODS AND APPARATUS FOR OPERATING GAS TURBINE ENGINES

(75) Inventors: Srinivasa Range Gowda, Cincinnati, OH (US); Kevin Sean Early, Oregonia, OH (US); Steven Martens, West Chester, OH (US)

(73) Assignee: General Electric Company, Schenectady, NY (US)

( * ) Notice: Subject to any disclaimer, the term of this patent is extended or adjusted under 35 U.S.C. 154(b) by 160 days.

(21) Appl. No.: 10/760,805

(22) Filed: Jan. 20, 2004

(65) Prior Publication Data

US 2005/0155343 A1 Jul. 21, 2005

(51) Int. Cl.
*F02K 1/48* (2006.01)

(52) U.S. Cl. .............................. 60/204; 60/262; 60/770; 239/265.43

(58) Field of Classification Search .................. 60/204, 60/262, 772, 770; 239/265.43
See application file for complete search history.

(56) References Cited

U.S. PATENT DOCUMENTS

| 4,808,246 | A | * | 2/1989 | Albrecht et al. ............ 148/527 |
| 6,318,070 | B1 | | 11/2001 | Rey et al. |
| 6,360,528 | B1 | | 3/2002 | Brausch et al. |
| 6,532,729 | B1 | | 3/2003 | Martens |
| 6,718,752 | B1 | * | 4/2004 | Nesbitt et al. ................ 60/262 |
| 2002/0125340 | A1 | * | 9/2002 | Birch et al. .................. 60/770 |

* cited by examiner

*Primary Examiner*—Louis J. Casaregola
(74) *Attorney, Agent, or Firm*—William Scott Andes; Armstrong Teasdale LLP

(57) ABSTRACT

A method of assembling a gas turbine engine includes coupling an annular exhaust duct to the gas turbine engine, coupling a plurality of chevrons to the annular exhaust duct, and coupling a chevron actuation system to the annular exhaust duct such that selective operation of the chevron actuation system repositions the plurality of chevrons to adjust an amount convergence of the annular exhaust duct.

18 Claims, 5 Drawing Sheets

METHODS AND APPARATUS FOR OPERATING GAS TURBINE ENGINES

BACKGROUND OF THE INVENTION

This invention relates generally to gas turbine engines, more particularly to methods and apparatus for operating gas turbine engines.

At least some known gas turbine engines include a core engine having, in serial flow arrangement, a fan assembly and a high pressure compressor which compress airflow entering the engine, a combustor which burns a mixture of fuel and air, and low and high pressure rotary assemblies which each include a plurality of rotor blades that extract rotational energy from airflow exiting the combustor.

Combustion gases are discharged from the core engine through an exhaust assembly. More specifically, within at least some known turbofan engines, a core exhaust nozzle discharges core exhaust gases radially inwardly from a concentric fan nozzle exhaust which exhausts fan discharge air therefrom for producing thrust. Typically, both exhaust flows have a maximum velocity when the engine is operated during high power operations, such as during take-off operations. During such operations, as the high velocity flows interact with each other and with ambient air flowing past the engine, substantial noise may be produced along the take-off path of the aircraft.

To facilitate reducing jet noise, at least some known turbine engine exhaust assemblies include a plurality of chevron nozzles to enhance mixing the core and bypass exhaust flows. Although the chevron nozzles do provide a noise benefit during take-off conditions, because the nozzles are mechanical devices which remain positioned in the flow path during all flight conditions, such devices may adversely impact engine performance during non-take-off operating conditions. Specifically, during cruise conditions, chevron nozzles may adversely impact specific fuel consumption (SFC) of the engine.

BRIEF DESCRIPTION OF THE INVENTION

In one aspect, a method of assembling a gas turbine engine is provided. The method includes coupling an annular exhaust duct to the gas turbine engine, coupling a chevron actuation system to the annular exhaust duct such that selective operation of the chevron actuation system repositions the plurality of chevrons to adjust an amount convergence of the annular exhaust duct.

In another aspect a method of operating a gas turbine engine that includes an annular exhaust duct and a plurality of chevrons coupled to the annular exhaust duct is provided. The method includes coupling a chevron actuation system to the annular exhaust duct wherein at least a portion of the chevron actuation system is fabricated from a shape memory alloy that has a memorized activation configuration and such that the plurality of chevrons are oriented in a first configuration during engine operation, and passively or actively heating the shape memory alloy such that the plurality of chevrons are reconfigured from the first configuration to an activation configuration.

In a further aspect, a gas turbine engine is provided. The gas turbine engine includes an annular exhaust duct for discharging exhaust from an aft end thereof, a plurality of circumferentially adjoining chevrons extending from the duct aft end, and a chevron actuation system coupled to the annular exhaust duct, a portion of the chevron actuation system fabricated from a shape memory alloy material.

DETAILED DESCRIPTION OF THE INVENTION

Figure 1:
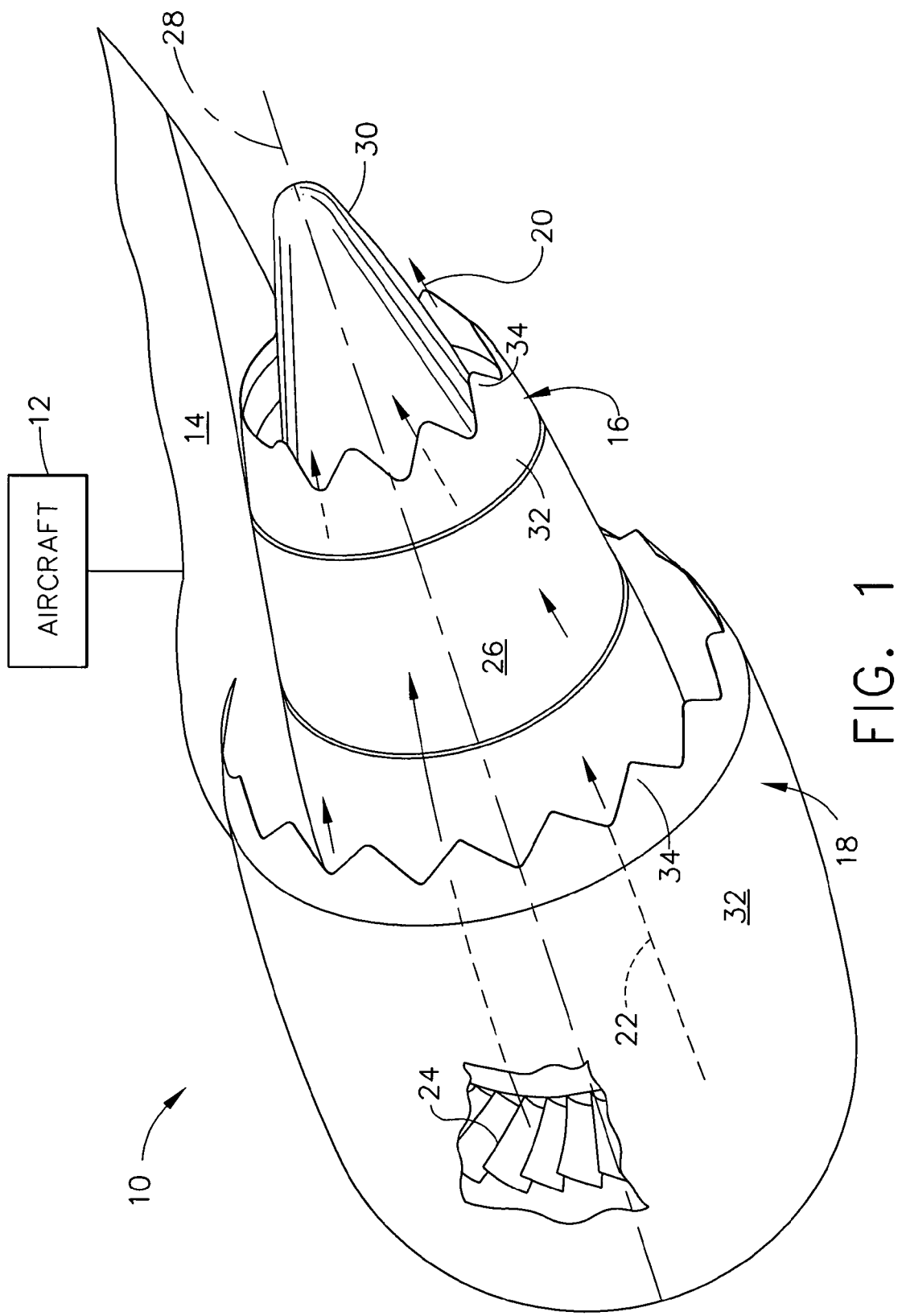
FIG. 1 is a schematic illustration of a gas turbine engine.

FIG. 1 is a perspective view of a turbofan aircraft gas turbine engine 10 coupled to a wing of an aircraft 12 using a pylon 14, for example. Engine 10 includes a core engine exhaust nozzle 16 and a fan nozzle exhaust 18 which discharge combustion gas exhaust 20 and pressurized fan air exhaust 22, respectively. Engine 10 also includes a fan 24 having at least one row of rotor blades mounted inside a corresponding fan nacelle at a forward end of engine 10. Fan 24 is driven by a core engine 26 which is mounted concentrically inside the fan nacelle along an axial or centerline axis 28. Core engine 26 includes a high pressure turbine (not shown) coupled to a compressor (not shown) which extracts energy from the combustion gases for powering the compressor. A low pressure turbine (not shown) is disposed downstream from the high pressure turbine and is coupled to fan 24 by a shaft (not shown) that is rotated by extracting additional energy from the combustion gases which are discharged as combustion gas exhaust 20 from core engine exhaust nozzle 16.

An annular centerbody 30 is spaced radially inwardly from core engine exhaust nozzle 16 and converging in the aft direction downstream therefrom. Core engine exhaust nozzle 16 and fan nozzle exhaust 18 each include an annular exhaust duct 32. In the exemplary embodiment, each annular exhaust duct 32 is a one-piece or substantially unitary ring positioned concentrically around centerline axis 28. In an alternative embodiment, engine 10 includes, but is not limited to, at least one of an internal plug nozzle, a long duct mixed flow nozzle, and a convergent/divergent (CD) variable area nozzle. A plurality of circumferentially adjoining chevrons 34 extend axially aft from an aft end of annular exhaust duct 32 preferably in a unitary and coextensive configuration therewith.

During operation, to produce thrust from engine 10, fan discharge flow is discharged through fan nozzle exhaust 18, and combustion gases are discharged from engine 10 through core engine exhaust nozzle 16. In one embodiment, engine 10 is operated at a relatively high bypass ratio which is indicative of the amount of fan air which bypasses engine 10 and is discharged through fan nozzle exhaust 18. In an alternative embodiment, engine 10 is operable with a low bypass ratio.

Figure 2:
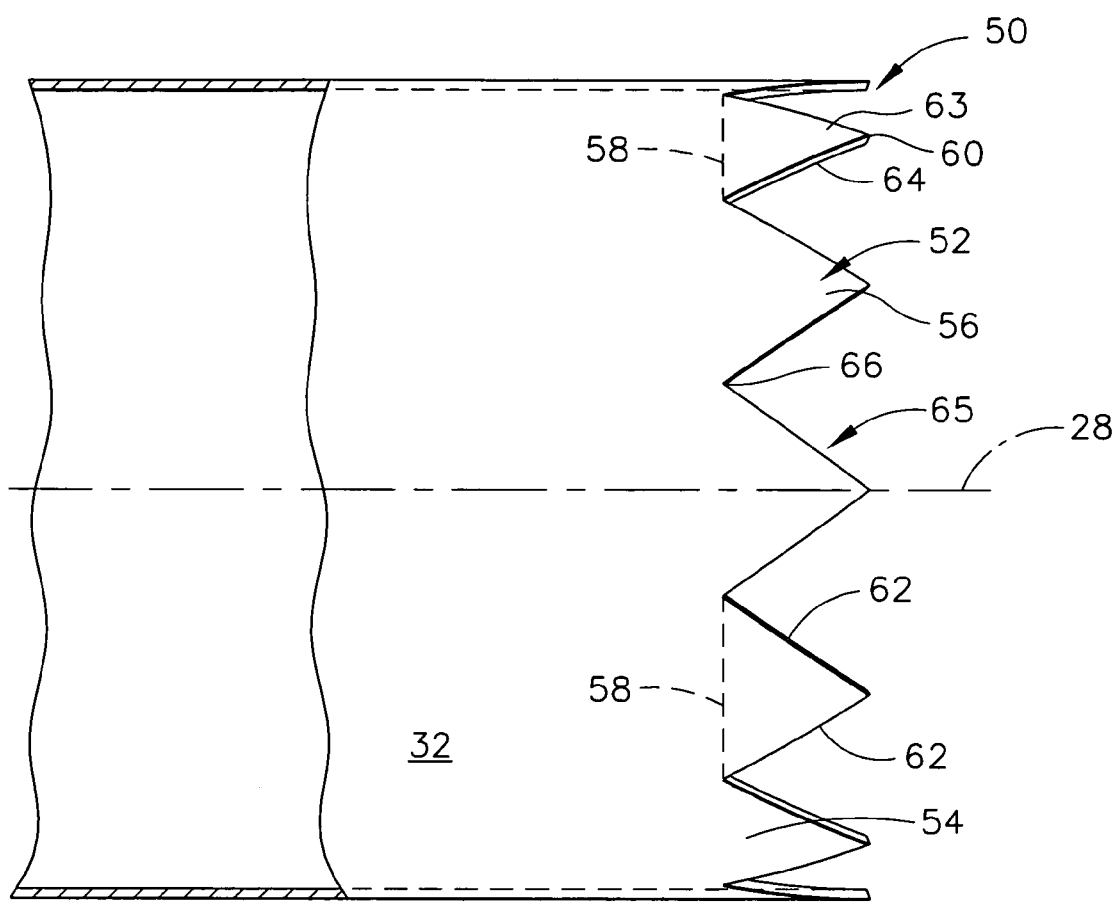
FIG. 2 is a side view of an exemplary nozzle that may be used with the gas turbine engine shown in FIG. 1.
Figure 3:
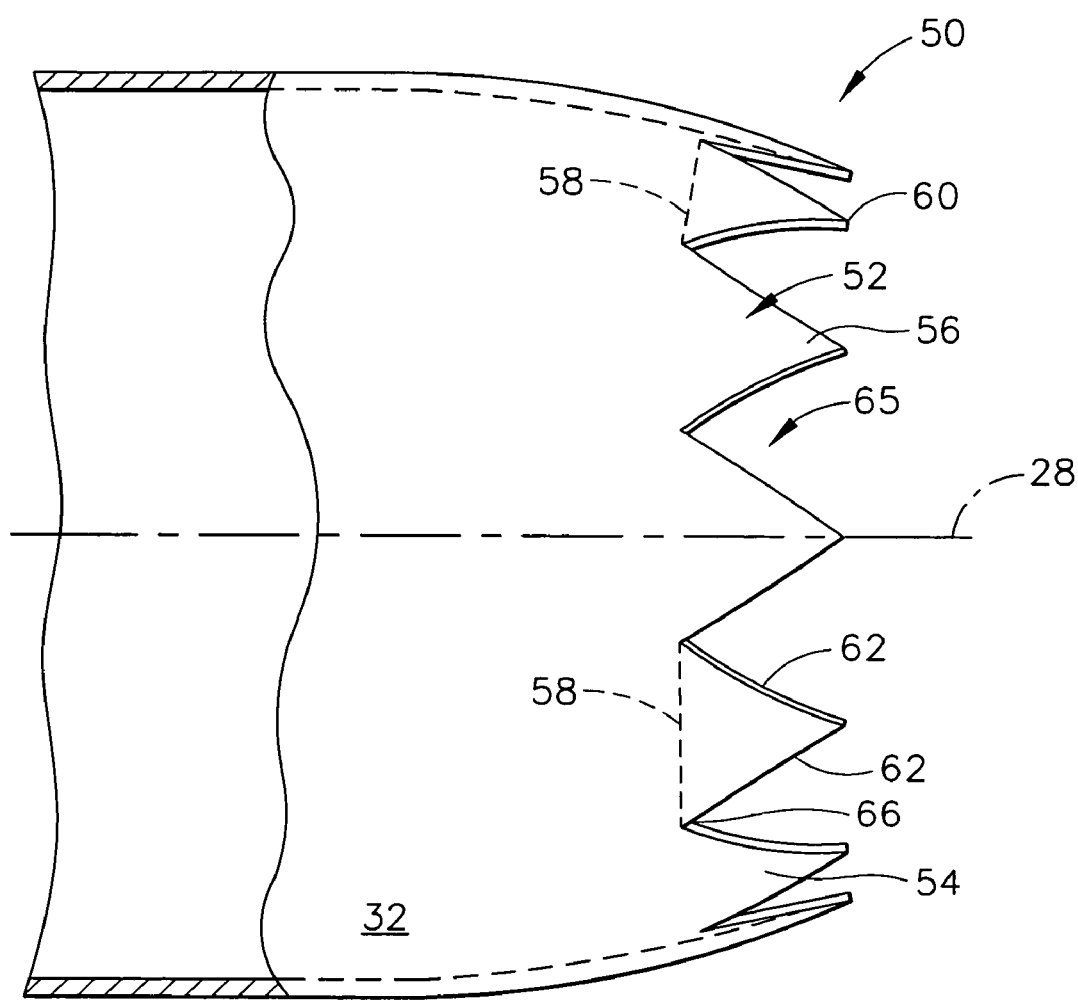
FIG. 3 is a perspective view of an exemplary chevron actuation system that may be used with the nozzle shown in FIG. 2.

FIG. 2 is a side view of an exemplary nozzle 50 that can be used with gas turbine engine 10, (shown in FIG. 1) in a first operational configuration. FIG. 3 is a side view of nozzle 50 in a second operational configuration. Nozzle 50 is substantially similar to core engine exhaust nozzle 16 and fan nozzle exhaust 18, (shown in FIG. 1) and components in nozzle system 50 that are identical to components of core engine exhaust nozzle 16 and fan nozzle exhaust 18 are identified in FIG. 2 and FIG. 3 using the same reference numerals used in FIG. 1. Accordingly, in one embodiment, nozzle 50 is a core engine exhaust nozzle. In another embodiment, nozzle 50 is a fan nozzle.

Nozzle 50 includes a plurality of circumferentially or laterally adjoining chevrons 52 integrally disposed at an aft end 54 of annular exhaust duct 32. Each chevron 52 has a geometric shape 56. In the exemplary embodiment, each chevron 52 has a substantially triangular shape and includes a base 58 fixedly coupled or integrally joined to annular exhaust duct 32. Each chevron 52 also includes an axially opposite apex 60, and a pair of circumferentially or laterally opposite trailing edges 62 or sides converging from base 58 to each respective apex 60 in the downstream, aft direction. Each chevron 52 also includes a radially outer surface 63, and a radially opposite inner surface 64 bounded by trailing edges 62 and base 58.

Trailing edges 62 of adjacent chevrons 52 are spaced circumferentially or laterally apart from the bases 58 to apexes 60 to define respective slots or cut-outs 65 diverging laterally and axially, and disposed in flow communication with the inside of annular exhaust duct 32 for channeling flow radially therethrough. In the exemplary embodiment, slots 65 are also triangular and complementary with triangular chevrons 52 and diverge axially aft from a slot base 66, which is circumferentially coextensive with chevron bases 58, to chevron apexes 60.

In one exemplary embodiment, each chevron outer surface 63 is disposed approximately parallel to centerline axis 28 to form a diverging exhaust nozzle as shown in FIG. 2. Moreover, as shown in FIG. 3, each chevron outer surface 63 can be re-positioned to adjust an amount convergence of the annular exhaust duct. Accordingly, repositioning each chevron 52 facilitates mixing effectiveness while at the same time providing an aerodynamically smooth and non-disruptive profile for minimizing losses in aerodynamic efficiency and performance.

Figure 4:
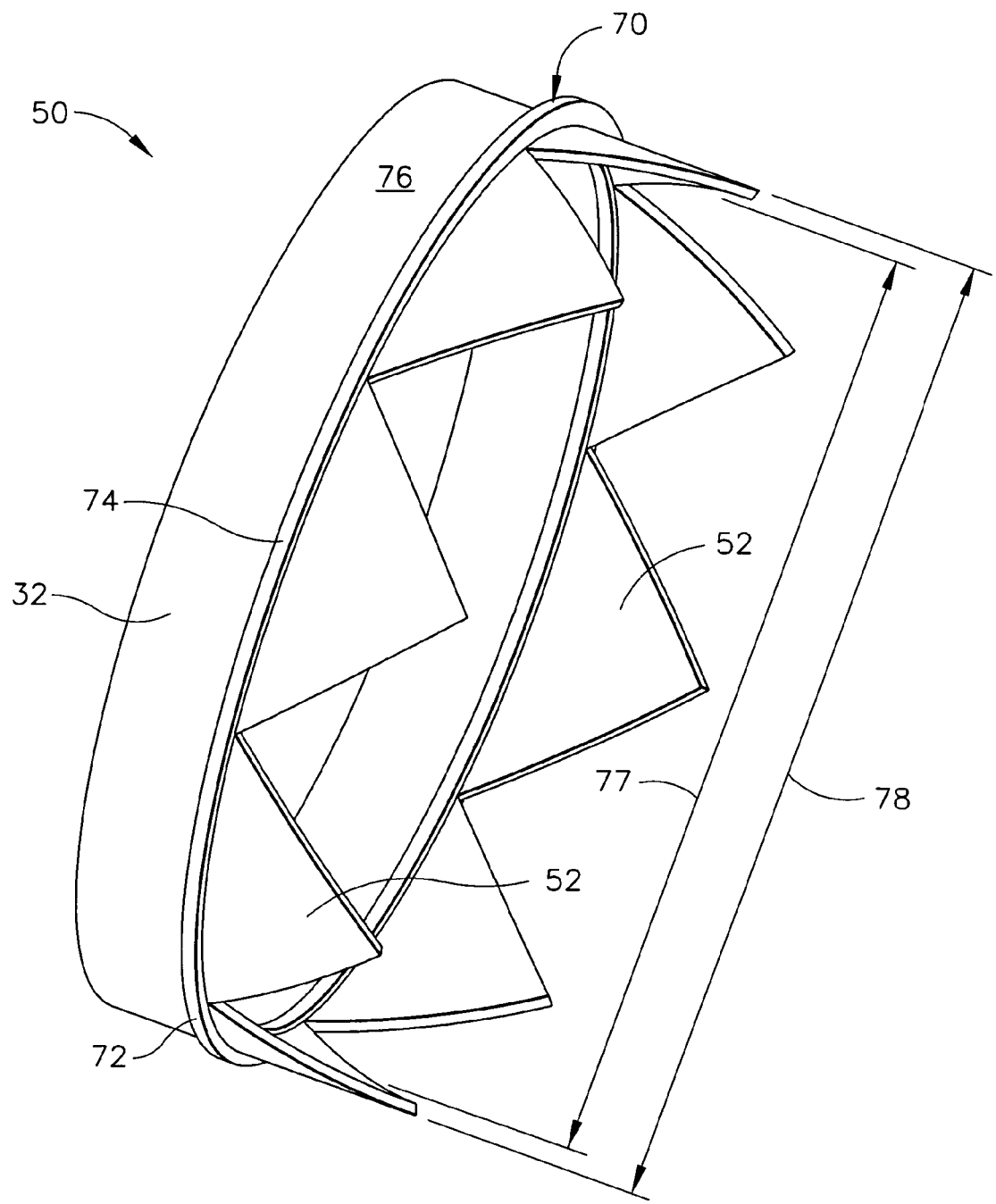
FIG. 4 is a perspective view of an exemplary chevron actuation system that may be used with the nozzle shown in FIG. 2.

FIG. 4 is a perspective view of an exemplary chevron actuation system 70 that can be used with nozzle 50 (shown in FIGS. 2 and 3). Chevron actuation system 70 includes an actuator or shape memory alloy band 72 coupled to annular exhaust duct 32. In the exemplary embodiment, actuator 72 is positioned forward of chevrons 52 and circumferentially around an outer periphery 76 of annular exhaust duct 32.

In the exemplary embodiment, single actuator 72 is fabricated from a shape memory alloy 74 having a memorized activated configuration. Shape memory alloy 74 is used to reposition chevrons 52 and thereby either increase or decrease the convergence of annular exhaust duct 32. As used herein a shape memory alloy is defined as a material which can be formed into any desired shape.

Various metallic materials are capable of exhibiting shape-memory characteristics. These shape-memory capabilities occur as the result of the metallic alloy undergoing a reversible crystalline phase transformation from one crystalline state to another crystalline state with a change in temperature and/or external stress. In particular, alloys of nickel and titanium exhibit these properties of being able to undergo energetic crystalline phase changes at ambient temperatures, thus giving them a shape-memory. These shape-memory alloy materials, if plastically deformed while cool, will revert to their original, undeformed shape when warmed. These energetic phase transformation properties render articles made from these alloys highly useful in a variety of applications. For example, the shape "training" of SMA's is accomplished by holding the SMA into their desired shape and then heating and holding to a higher temperature. Upon cooling, the SMA will retain the desired shape. When the SMA is mechanically deformed at a lower temperature, the SMA will revert to its "trained shape" upon subsequent heating. An article made of an alloy having shape-memory properties can be deformed at a low temperature from its original configuration, but the article "remembers" its original shape, and returns to that shape when heated. More specifically, and in the exemplary embodiment, For example, in nickel-titanium alloys possessing shape-memory characteristics, the alloy undergoes a reversible transformation from an austenitic state to a martensitic state with a change in temperature. This transformation is often referred to as a thermoelastic martensitic transformation. The reversible transformation of the NiTi alloy between the austenite to the martensite phases occurs over two different temperature ranges which are characteristic of the specific alloy. As the alloy cools, it reaches a temperature $M_s$ at which the martensite phase starts to form, and finishes the transformation at a still lower temperature $M_f$. Upon reheating, it reaches a temperature $A_s$ at which austenite begins to reform and then a temperature $A_f$ at which the change back to austenite is complete. In the martensitic state, the alloy can be easily deformed. When sufficient heat is applied to the deformed alloy, it reverts back to the austenitic state, and returns to its original configuration. Accordingly, in the exemplary embodiment actuator 72 is fabricated from a material such as, but not limited to, NiTi, NiTi—Pt, TiRu, NiTiCu, CuZnAl, CuAlNi, NiTiFe, CuAlNiTiMn, TiNiPd, TiNiPt, NiTiPd, and TiNiHf. In the exemplary embodiment, the lower temperature chevrons used for the fan chevrons are fabricated from a Ni—Ti alloy, and the higher temperature chevrons used for the core engine chevrons are fabricated from a Ni—Ti—Pt alloy.

During operation, chevron actuation system 70 is operable in at least one of an active mode and a passive mode. In the active mode, an electrical current is input to actuator 72, i.e. shape memory alloy 74, such that actuator 72 is contracted around outer periphery 76 of annular exhaust duct 32. Contracting actuator 72 causes shape memory alloy band 72 to reconfigure from a first length 77 to a second length 78, shorter than first length 77, thus causing plurality of chevrons 52 to deflect inwardly toward central axis 28 (shown in FIG. 3). More specifically, shape memory alloy band 72 contracts around outer periphery 76 such that a convergence of nozzle 50 is increased. When actuator 72 is de-energized, plurality of chevrons 52 deflect outwardly from central axis 28 such that plurality of chevrons 52 are substantially parallel to outer periphery 76 of annular exhaust duct 32, thus decreasing the convergence of nozzle 50 (shown in FIG. 4).

In the passive mode, heat is input to actuator 72, i.e. shape memory alloy 74, such that actuator 72 is contracted around outer periphery 76 of annular exhaust duct 32. In the exemplary embodiment, heat is supplied from engine 10 during takeoff or landing, for example. More specifically, engine exhaust flow, during operations other than take-off, flows past chevrons 52 but does not result in activation of actuator 72 since the temperature of the exhaust is not great enough to activate shape memory alloy 74. During take-off operations, engine exhaust flow, having an increased temperature, flows past chevrons 52 and actuates shape memory alloy 74 resulting in an increased convergence of exhaust nozzle 50. When the airplane has reached a cruise condition, the temperature of the exhaust flow is reduced, resulting in chevrons 52 deflecting away from central axis 28, such that a convergence of nozzle 50 is decreased.

Figure 5:
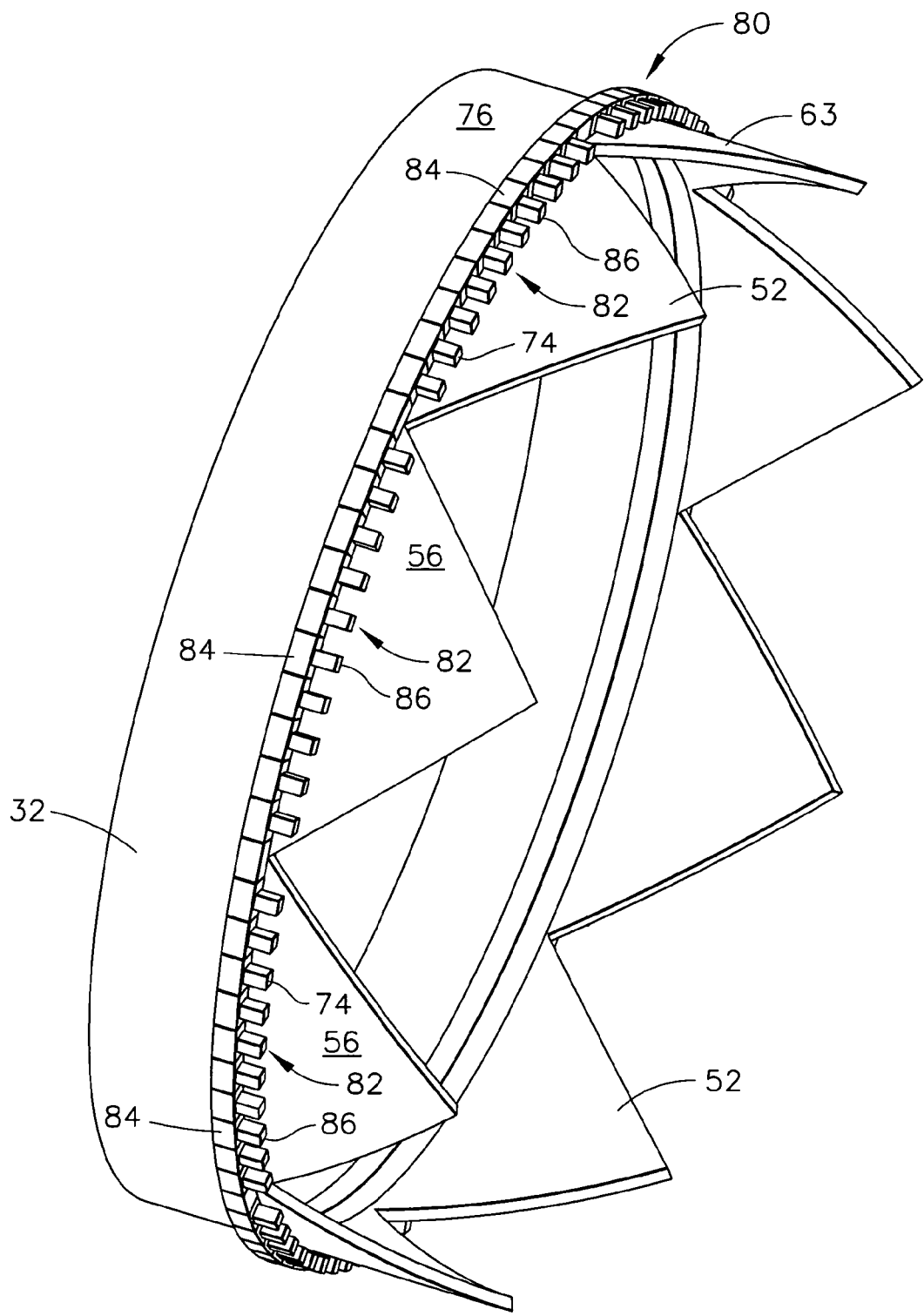
FIG. 5 is a perspective view of an alternative embodiment of a chevron actuation system that can be used with the nozzle shown in FIG. 2.

FIG. 5 is a perspective view of an exemplary chevron actuation system 80 that can be used with nozzle 50 (shown in FIGS. 2 and 3). Chevron actuation system 80 includes a plurality of actuators 82 coupled to annular exhaust duct 32. In the exemplary embodiment, each actuator 82 includes a mounting portion 84 and a finger 86 coupled to mounting portion 84 and extending along outer surface 63 of each chevron 52. In the exemplary embodiment, a plurality of fingers 86 are positioned along outer surface 63 of each chevron 52 and circumferentially around outer perimeter 76 of annular exhaust duct 32.

In the exemplary embodiment, fingers 86 are fabricated from shape memory alloy 74 having a memorized activated configuration. In the exemplary embodiment, shape memory alloy 74 is activated to reposition chevrons 52 and thereby either increase or decrease a convergence of the nozzle. As used herein a shape memory alloy is defined as a material which can be formed into any desired shape as described previously herein. Accordingly, in the exemplary embodiment actuator fingers 86 are fabricated from material such as, but not limited to, NiTi, TiRu, NiTiCu, CuZnAl, CuAlNi, NiTiFe, CuAlNiTiMn, TiNiPd, TiNiPt, NiTiPd, and TiNiHf.

During operation, chevron actuation system 80 is operable in at least one of an active mode and a passive mode. In the active mode, an electrical current is input to each finger 86, i.e. shape memory alloy 74, such that each finger 86 is contracted around outer periphery 76 of annular exhaust duct 32. Contracting fingers 86 causes plurality of chevrons 52 to deflect inwardly toward central axis 28 (shown in FIG. 3). Accordingly, actuating fingers 86 increases a convergence of nozzle 50. When fingers 86 are de-energized, plurality of chevrons 52 deflect outwardly from central axis 28 such that plurality of chevrons 52 are substantially parallel to outer periphery 76 of annular exhaust duct 32, thus decreasing the convergence of nozzle 50 (shown in FIG. 5).

In the passive mode, heat is applied to fingers 86 to activate shape memory alloy 74. In the exemplary embodiment, heat is supplied from the engine during engine takeoff or landing, for example. More specifically, engine exhaust flow, during operations other than take-off, flows past chevrons 52 but does not result in activation of fingers 86 since the temperature of the exhaust is not great enough to activate shape memory alloy 74. During take-off operations, engine exhaust flow, having an increased temperature, flows past chevrons 52 and actuates shape memory alloy 74 thereby increasing a convergence of exhaust nozzle 50 (shown in FIG. 3). When the airplane has reached a cruise condition, the temperature of the exhaust flow is reduced, resulting in chevrons 52 deflecting away from central axis 28, such that a convergence of nozzle 50 is decreased (shown in FIG. 5).

In another exemplary embodiment, nozzle 50 includes a plurality of circumferentially or laterally adjoining chevrons 52 integrally disposed at an aft end 54 of annular exhaust duct 32. Each chevron 52 has a geometric shape 56. In the exemplary embodiment, each chevron 52 has a substantially triangular shape and is fabricated from a shape memory alloy material. Additionally, the shape metal alloy chevrons may be operated in either a passive or active mode as described previously herein. Accordingly, fabricating each chevron from a shape memory alloy material facilitates reducing a quantity of parts used to fabricate nozzle 50 and thereby facilitates reducing the time required to fabricate the nozzle.

The above-described nozzle exhaust system includes a plurality of chevrons which can be repositioned to either increase a convergence of the exhaust nozzle during takeoff or decrease a convergence of the exhaust nozzle during cruise conditions using a shape memory alloy. The shape memory alloy is selectably operable using either electrical current supplied to the shape memory alloy or using engine exhaust heat. According, the shape memory alloy reconfigures the exhaust nozzle chevrons only when required, during takeoff for example, and streamlines the exhaust nozzle chevrons when not required, during cruise conditions for example. Accordingly, the nozzle system described herein facilitates reducing noise during takeoff or landing, and reducing or eliminating engine performance losses during cruise conditions.

Exemplary embodiments of noise suppression systems and exhaust assemblies are described above in detail. The exhaust assemblies are not limited to the specific embodiments described herein, but rather, components of each assembly may be utilized independently and separately from other components described herein. For example, each noise suppression component can also be used in combination with other exhaust assemblies.

While the invention has been described in terms of various specific embodiments, those skilled in the art will recognize that the invention can be practiced with modification within the spirit and scope of the claims.

What is claimed is:

1. A method of assembling a gas turbine engine, said method comprising:
    coupling an annular exhaust duct to the gas turbine engine;
    coupling a plurality of chevrons to the annular exhaust duct; and
    coupling a chevron actuation system to the annular exhaust duct such that a band extends around an outer periphery of the annular exhaust duct, wherein the band facilitates repositioning the plurality of chevrons to selectively adjust an amount convergence of said annular exhaust duct.

2. A method in accordance with claim 1 wherein coupling a chevron actuation system to the annular exhaust duct further comprises coupling a chevron actuation system that is fabricated at least partially from a shape memory alloy to the annular exhaust duct.

3. A method in accordance with claim 1 wherein coupling a chevron actuation system to the annular exhaust duct further comprises coupling a chevron actuation system that is operable in at least one of a passive mode and an active mode to the annular exhaust duct.

4. A method in accordance with claim 3 wherein operating in the passive mode comprises using engine exhaust nozzle heat to activate a shape memory alloy and thereby increase a convergence of the annular exhaust duct.

5. A method in accordance with claim 3 wherein operating in the active mode comprises using electricity to activate a shape memory alloy and thereby increase a convergence of the annular exhaust duct.

6. A method in accordance with claim 1 wherein coupling a chevron actuation system to the annular exhaust duct further comprises coupling a band fabricated from a shape memory alloy around an outer periphery of the annular exhaust duct.

7. A method of operating a gas turbine engine that includes an annular exhaust duct and a plurality of chevrons coupled to the annular exhaust duct, said method comprising:

coupling a chevron actuation system to the annular exhaust duct including a band fabricated from a shape memory alloy that has a memorized activation configuration and such that the plurality of chevrons are oriented in a first configuration; and heating the shape memory alloy such that the plurality of chevrons are reconfigured from the first configuration to an activation configuration.

8. A method in accordance with claim 7 wherein coupling a chevron actuation system to the annular exhaust duct comprises coupling a chevron actuation system to at least one of a turbine engine exhaust duct and a fan exhaust duct.

9. A method in accordance with claim 7 wherein coupling a chevron actuation system to the annular exhaust duct comprises coupling a band to the duct, wherein the band has a first length at a first temperature and has a second length at a second temperature, wherein the first length is longer than the second length and the first temperature is less than the second temperature.

10. A method in accordance with claim 7 wherein coupling a chevron actuation system to the annular exhaust duct further comprises coupling a chevron actuation system that is fabricated from a shape memory alloy to the annular exhaust duct, wherein the shape memory alloy is transformable from a martensitic state to an austenitic state, and wherein the actuator is restorable from an initial configuration to a memorized configuration at an operating temperature which causes the shape memory alloy to transform to the austenitic state.

11. A method in accordance with claim 7 wherein coupling a chevron actuation system to the annular exhaust duct comprises coupling a chevron actuation system fabricated from at least one of an alloy of nickel and titanium, and an alloy of nickel and ruthenium, to the annular exhaust duct.

12. A gas turbine engine comprising:
an annular exhaust duct comprising an aft end, said annular exhaust duct for discharging exhaust from an aft end of said gas turbine engine;
a plurality of circumferentially adjoining chevrons extending from said duct aft end; and
a chevron actuation system coupled to said annular exhaust duct for controlling relative movement of said plurality of chevrons, said chevron actuation system comprising a band fabricated from a shape memory alloy material.

13. A gas turbine engine in accordance with claim 12 wherein said annular exhaust duct comprises at least one of an core engine exhaust duct and a fan exhaust duct.

14. A gas turbine engine in accordance with claim 12 wherein at least a portion of said chevron actuation system comprises at least one of an alloy of nickel and titanium, and an alloy of nickel and ruthenium.

15. A gas turbine engine in accordance with claim 12 wherein said shape memory alloy is transformable from a martensitic state to an austenitic state, and wherein said actuator is restorable from an initial configuration to a memorized configuration at an operating temperature that causes the shape memory alloy to transform to the austenitic state.

16. A gas turbine engine in accordance with claim 12 wherein said shape memory alloy is configured to reposition said plurality of chevrons radially inwardly towards a gas turbine centerline axis when activated.

17. A gas turbine engine comprising:
an annular exhaust duct comprising an aft end, said annular exhaust duct for discharging exhaust from an aft end of said gas turbine engine; and
a plurality of circumferentially adjoining chevrons extending from said duct aft end, said plurality of circumferentially adjoining chevrons extend from an annular band fabricated from a shape memory alloy material.

18. A gas turbine engine in accordance with claim 17 wherein said annular exhaust duct comprises at least one of an core engine exhaust duct and a fan exhaust duct.

* * * * *